(12) United States Patent
Ellison et al.

(10) Patent No.: US 8,948,335 B2
(45) Date of Patent: Feb. 3, 2015

(54) SYSTEM FOR DAMPENING VIBRATION

(75) Inventors: Phillip G. Ellison, Wilmington, NC (US); John R. Bass, Leland, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1437 days.

(21) Appl. No.: 12/494,395

(22) Filed: Jun. 30, 2009

(65) Prior Publication Data

US 2010/0329412 A1  Dec. 30, 2010

(51) Int. Cl.
  G21C 9/00 (2006.01)
  G21C 15/25 (2006.01)
(52) U.S. Cl.
  CPC *G21C 15/25* (2013.01); *Y02E 30/40* (2013.01)
  USPC ........... 376/305; 376/347; 376/361; 376/402; 376/407
(58) Field of Classification Search
  CPC ....... G21C 15/24; G21C 15/243; G21C 15/25
  USPC ......... 376/347, 361, 366, 370, 372, 402, 407, 376/392
  See application file for complete search history.

(56) References Cited

U.S. PATENT DOCUMENTS

| | | | |
|---|---|---|---|
| 4,285,770 A | 8/1981 | Chi et al. | |
| 5,876,146 A * | 3/1999 | Deaver et al. | 403/11 |
| 6,438,192 B1 * | 8/2002 | Erbes et al. | 376/372 |
| 6,450,774 B1 | 9/2002 | Erbes et al. | |
| 2002/0106281 A1 * | 8/2002 | Erbes et al. | 417/151 |
| 2008/0029969 A1 | 2/2008 | Torres | |
| 2008/0031741 A1 | 2/2008 | Torres | |

FOREIGN PATENT DOCUMENTS

| | | |
|---|---|---|
| JP | S5627100 A | 3/1981 |
| JP | S5692305 U | 7/1981 |
| JP | S57204499 U | 12/1982 |
| JP | 58015798 A | 1/1983 |

OTHER PUBLICATIONS

EP 10167571.8, European Search Report and Written Opinion, Dec. 8, 2010.
Unofficial English translation of JP Office Action issued Apr. 30, 2014 in connection with corresponding JP Patent Application No. 2010147640.

* cited by examiner

*Primary Examiner* — Jack W Keith
*Assistant Examiner* — Marshall O'Connor
(74) *Attorney, Agent, or Firm* — Ryan Alley Intellectual Property Law

(57) ABSTRACT

An embodiment of the present invention takes the form of a system that may reduce the level of flow-induced vibration (FIV) experienced by a jet pump assembly or other similar object within a pressure vessel. Essentially, an embodiment of the present invention may reduce the slip-joint leakage, which may be a cause of the FIVs, by adding a flow-limiting component to an outlet of the slip joint. This component may take the form of a collar, channel, and/or other component that may be connectable to a component of the jet pump assembly. After installation, an embodiment of the present invention may lower the amplitude of, and/or change the frequency of, the FIVs experienced by the jet pump assembly.

16 Claims, 4 Drawing Sheets

SYSTEM FOR DAMPENING VIBRATION

BACKGROUND OF THE INVENTION

The present invention relates generally to piping used in various industries to move fluid; and more particularly to a system for mitigating flow-induced vibrations (FIV) associated with transport and/or circulating a cooling fluid in heat-generating systems, such as nuclear reactors and hydroelectric generation systems.

Structural conduits, such as, but not limiting of, pipes, tubes, and cylinders are commonly used to transport a variety of fluids. Typically, the conduits are submerged in the same fluids that the conduit is transporting. For example, but not limiting of, the tubular components of a jet pump assembly are housed within a nuclear reactor pressure vessel (RPV) and reside in the fluid that the jet pump transports. Here, the jet pump assembly transports the cooling water to the reactor core, while the jet pump assembly is submerged in the same cooling fluid.

The conduits that comprise such submerged systems are typically supported within the surrounding structures (e.g., the RPV) by a restraining apparatus. The surrounding structures may be formed of a material different than the conduit material. For example, but not limiting of, the RPV may be formed of carbon steel; and the jet pump assembly may be formed of stainless steel. These different materials tend to have different thermal coefficients of expansion. In order to accommodate for the different amounts of thermal expansion associated with RPV operation, slip joints are installed along the conduits to minimize thermal stress within the conduits.

Experience has shown that if a sufficient pressure gradient exists across slip joint interfaces, the connecting tubular components may incur detrimental FIV. This may lead to a failure possibly resulting from excessive wear and/or fatigue of the conduit material or the support/restraining apparatus. These failures may occur to the jet pump assemblies used in RPVs.

The slip joint typically has an operating clearance that accommodates the relative axial thermal expansion movement between components of the jet pump assembly. This clearance permits a leakage flow from the driving pressure inside the jet pump assembly. Excessive leakage flow, however, can cause an oscillatory motion in the slip joint, which may be one source of FIV experienced by the jet pump assembly.

Some known systems and methods for mitigating this FIV may be insufficient in producing a long-term and effective reduction of the vibration. In addition, those systems and methods may impose a lateral force on the slip joint. This lateral force may prevent axial movement in the slip joint, and not properly allow for adequate thermal expansion in the slip joint.

Based on the above discussion, there may be a desire for a system for reducing the FIVs experienced by a conduit submerged within the fluid that the conduit transports. The system should provide a simplified way to prevent and/or mitigate the FIVs.

BRIEF DESCRIPTION OF THE INVENTION

In accordance with an embodiment of the present invention, a system configured for mitigating flow induced vibrations (FIV) experienced by a conduit system partially submerged within a fluid that the conduit system transports, the system comprising: a slip joint for a pressure vessel, wherein the slip joint integrates an inlet mixer and a diffuser; and a collar adapted for reducing leakage associated with the slip joint, wherein the collar limits a fluid flow exiting the slip joint, and wherein the collar is located adjacent the slip joint.

In accordance with another embodiment of the present invention, a jet pump system for configured for dampening a level of vibration experienced by a pipe within a power plant; the system comprising:
  a. a pressure vessel (RPV);
  b. an inlet mixer;
  c. a diffuser integrated with the inlet mixer via a slip joint; and a collar adapted for reducing leakage associated with the slip joint, wherein the channel limits a fluid flow exiting the slip joint and wherein the channel is located adjacent the slip joint.

BRIEF DESCRIPTION OF THE DRAWING

FIG. 4, are schematics of an inlet mixer integrated with an embodiment of a diffuser collar, in accordance with an embodiment of the present invention.

DETAILED DESCRIPTION OF THE INVENTION

Certain terminology may be used herein for convenience only and is not to be taken as a limitation on the invention. For example, words such as "upper", "lower", "left", "front", "right", "horizontal", "vertical", "upstream", "downstream", "fore", and "aft" merely describe the configuration shown in the FIGS. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

The present invention takes the form of a system that may reduce the level of flow-induced vibration (FIV) experienced by a jet pump assembly or other similar object within a nuclear reactor pressure vessel RPV 10. Essentially, an embodiment of the present invention may reduce the slip-joint leakage, which may be a cause of the FIVs, by adding a flow-limiting component to an outlet of the slip joint. This component may take the form of a collar, channel, and/or other component that may be connectable to a component of the jet pump assembly. After installation, an embodiment of the present invention may lower the amplitude of, and/or change the frequency of, the FIVs experienced by the jet pump assembly.

The following discussion focuses on an embodiment of the present invention integrated with the jet pump assemblies of the RPV. Other embodiments of the present invention may be integrated with other systems that require a dampening of and/or frequency change in FIVs.

Figure 1:
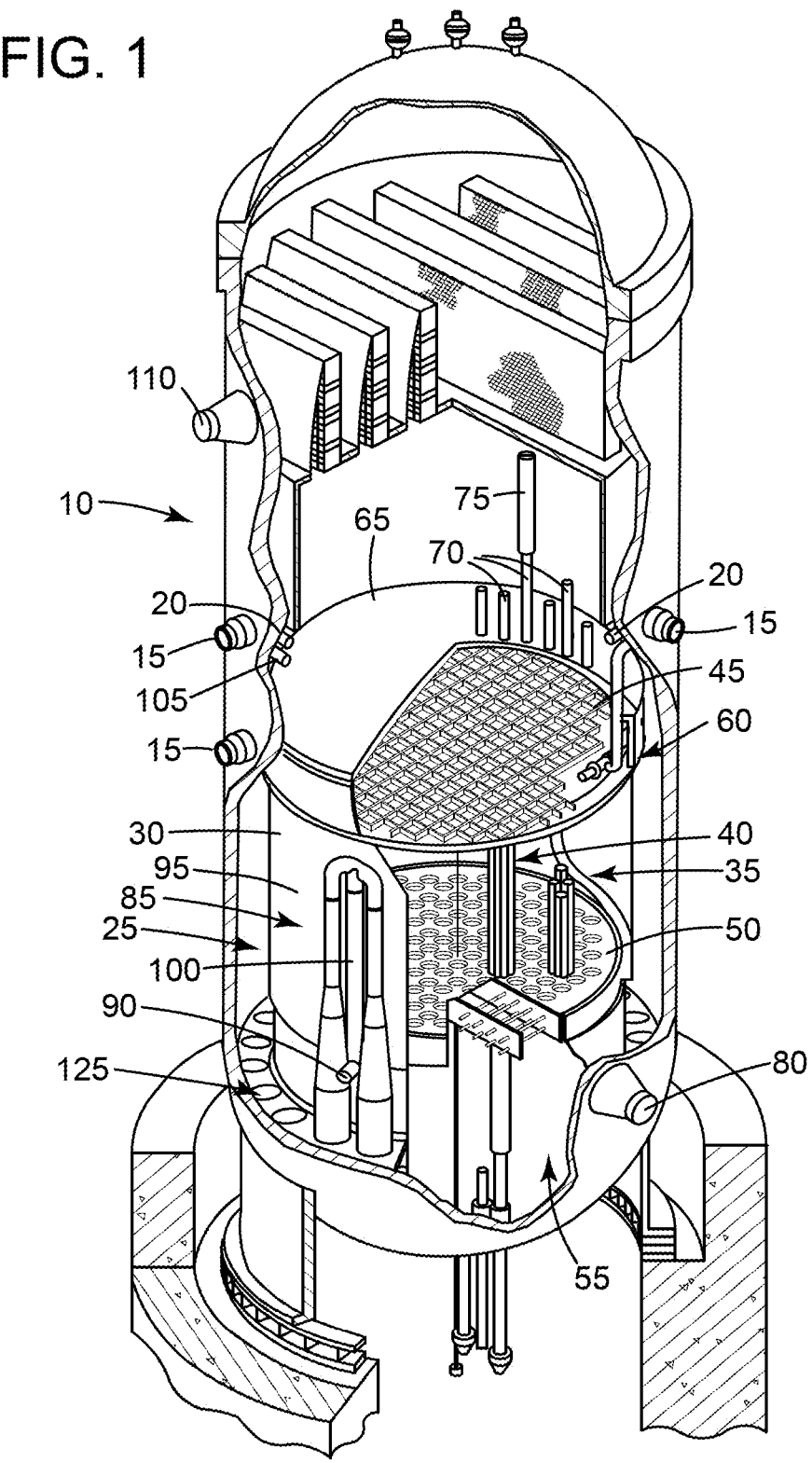
FIG. 1 is a schematic, illustrating a boiling water reactor partially in cross-section, within which an embodiment of the present invention operates.

Referring now to the FIGS., where the various numbers represent like parts throughout the several views. A non-limiting example of a nuclear reactor, a conventional boiling water reactor (BWR), is shown in FIG. 1. FIG. 1 is a schematic, illustrating a boiling water reactor partially in cross-section, within which an embodiment of the present invention operates. A typical BWR includes: a RPV 10; a core shroud 30 is disposed within the RPV 10 and surrounds a core plate 22; and a nuclear fuel core 35. Generally the RPV 10 has a cylindrical shape and is closed at one end by a bottom head, and at an opposite end by a removable top head. The core shroud 30 is a cylinder that surrounds the nuclear fuel core 35, which includes a plurality of fuel bundle assemblies 40 disposed within the core shroud 30. A top guide 45 may be spaced above a core plate 50 and supports each of the fuel bundle assemblies 40.

An annular region between the core shroud 30 and the RPV 10 is considered the downcomer annulus 25. Coolant water flows through the downcomer annulus 25 and into the core lower plenum 55. Feedwater enters the RPV 10 via a feedwater inlet 15 and is distributed circumferentially within the RPV 10 by a feedwater sparger 20, which is adjacent a core spray line 105. Then, the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated to the downcomer annulus 25 and the steam exits the RPV 10 via a nozzle 110 for use in generating electricity and/or in another process.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. Some inlet mixers 95 comprise a set of five nozzles circumferentially distributed at equal angles about an axis of the inlet mixer 95. Here, each nozzle is tapered radially and inwardly at the nozzle outlet. This convergent nozzle energizes the jet pump assembly 85. A secondary inlet opening (not illustrated) is located radially outside of the nozzle exit. Therefore, as jets of water exit the nozzles, water from the downcomer annulus 25 is drawn into the inlet mixer 95 via the secondary inlet opening, where mixing with water from the recirculation pump occurs.

The RPV 10 also includes a coolant recirculation system, which provides the forced convection flow through the nuclear fuel core 35 necessary to attain the required power density. A portion of the water is drawn from the lower end of the downcomer annulus 25 via a recirculation water outlet 80 and forced by the recirculation pump into a plurality of jet pump assemblies 85 via recirculation water inlets 90. The jet pump assemblies 85 are typically circumferentially distributed around the core shroud 30 and provide the required reactor core flow. A typical RPV 10 has between twelve to twenty-four inlet mixers 95.

Figure 2:
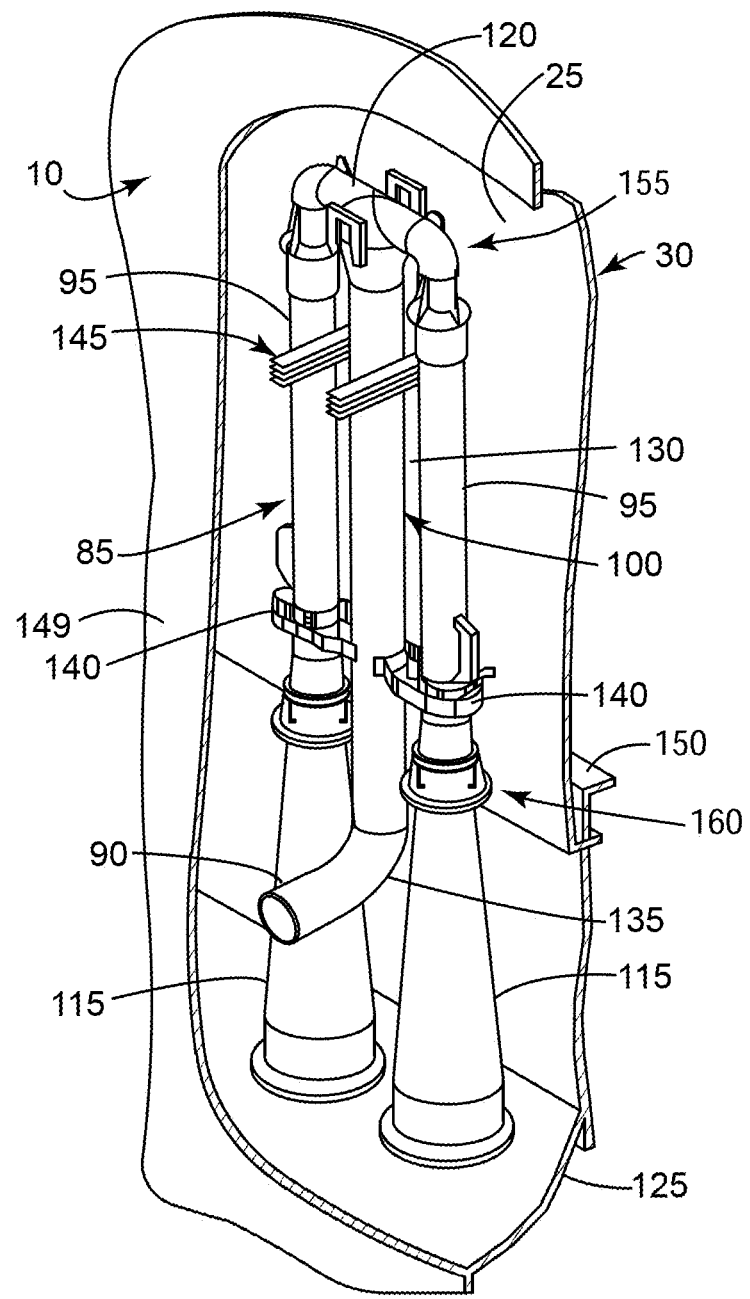
FIG. 2 is a schematic, illustrating a cutaway of the jet pump assembly of the boiler water reactor of FIG. 1.

FIG. 2 is a schematic, illustrating a cutaway of the jet pump assembly 85 of the RPV 10 of FIG. 1. Typically, each jet pump assembly 85 includes at least the following. A transition piece 120, a riser pipe 130 extending downwardly from the transition piece 120 to a riser elbow 135. The riser elbow 135 connects the riser pipe 130 to a recirculation inlet 90 along a wall of the RPV 10. A transition assembly 155 connects the inlet riser 100 with the inlet mixers 95.

A pair of inlet mixers 95 extends downwardly from the transition piece 120 to a pair of diffusers 115 mounted over holes in a pump deck 125. The pump deck 125 connects a bottom portion of the core shroud 30 with the RPV 10. The riser pipe 130 is typically tubular and is oriented vertically within the downcomer annulus 25, in parallel relation to the wall of the core shroud 30. The riser elbow 135 is typically tubular and bends outwardly toward the recirculation inlet 90. The transition piece 120 extends in opposite lateral directions at the top of the riser pipe 130 to connect with the inlet mixers 95 on opposite sides of the riser pipe 130. The inlet mixers 95 are oriented vertically in the downcomer annulus 25 in parallel relation to the riser pipe 130. Restrainer brackets 140, located between the inlet mixers 95 and the riser pipe 130, provide lateral support for the inlet mixers 95. A riser brace 145 may support and stabilize the inlet riser 100 in the region of the downcomer annulus 25. The riser brace 145 may also integrate the inlet riser 100 with an attachment wall 149 of the RPV 10.

The diffusers 115 may be coupled to the inlet mixer 95 by a slip joint 160. This configuration may facilitate the disassembly and repair of the jet pump assembly 95. As described, the slip joint 160 may have an operational clearance 175, which accommodates the relative axial thermal expansion between the upper and lower parts of the jet pump assembly 85 and may permit leakage flow from the driving pressure inside the jet pump assembly 85.

Figure 3:
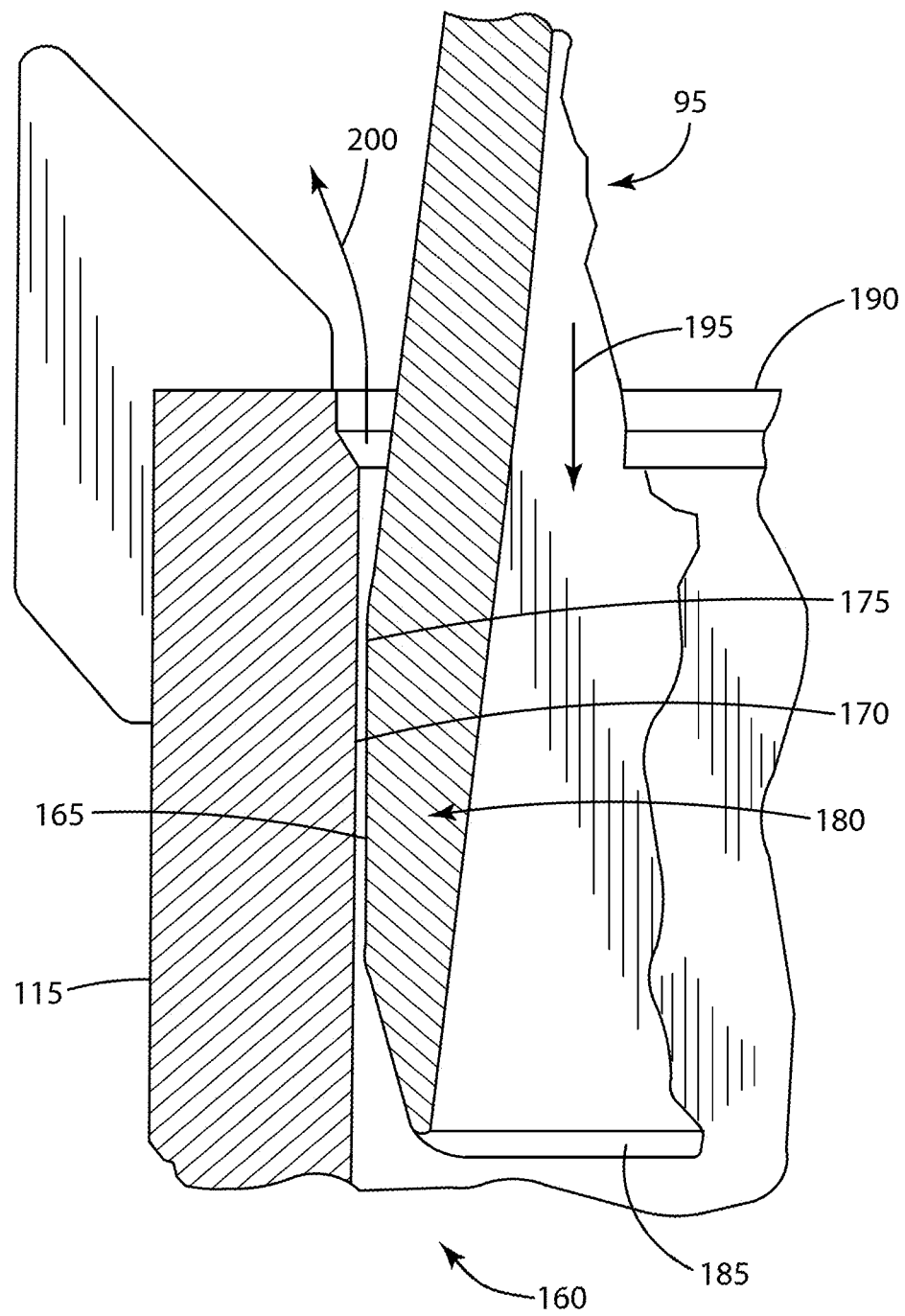
FIG. 3 is a schematic, illustrating an enlarged view, in cross section, of the relative positioning of the inlet mixer and the diffuser within the slip joint of FIG. 2.

FIG. 3 is a schematic, illustrating an enlarged view, in cross section, of the relative positioning of the inlet mixer 95 and the diffuser 115 within the slip joint 160 of FIG. 2. FIG. 3 illustrates that the inlet mixer 95 may be generally cylindrical and has an outer wall surface 165. The inlet mixer 95 has an open end 185, which is received in an open end 190 of the diffuser 115, which may have a cylindrical shape. The diffuser 115 may have an inner wall surface 170 positioned adjacent to the outer wall surface 165 of the inlet mixer 95. An operational clearance 175 typically exists at an interface 180 between the outer wall surface 165 of the inlet mixer 95 and the inner wall surface 170 of the diffuser 115. When fluid is pumped through the inlet mixer 95 into the diffuser 115, in the direction of arrow 195, leakage of some of the fluid occurs through the clearance 175 in the slip joint 160, as shown by arrow 200.

Leakage flow at the slip joint 160 interface 180 may become unsteady and non-uniform due to relative lateral motion between the two mating parts, the inlet mixer 95 and diffuser 115. This leakage flow may be the source of a FIV excitation in the jet pump assembly 85. Undesirable levels of FIV may be possible in some jet pump designs at some abnormal operational conditions having increased unsteady slip joint leakage flow rates.

Figure 4B:
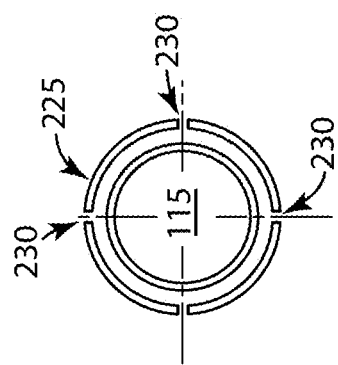
FIGS. 4A and 4B, collectively
Figure 4A:
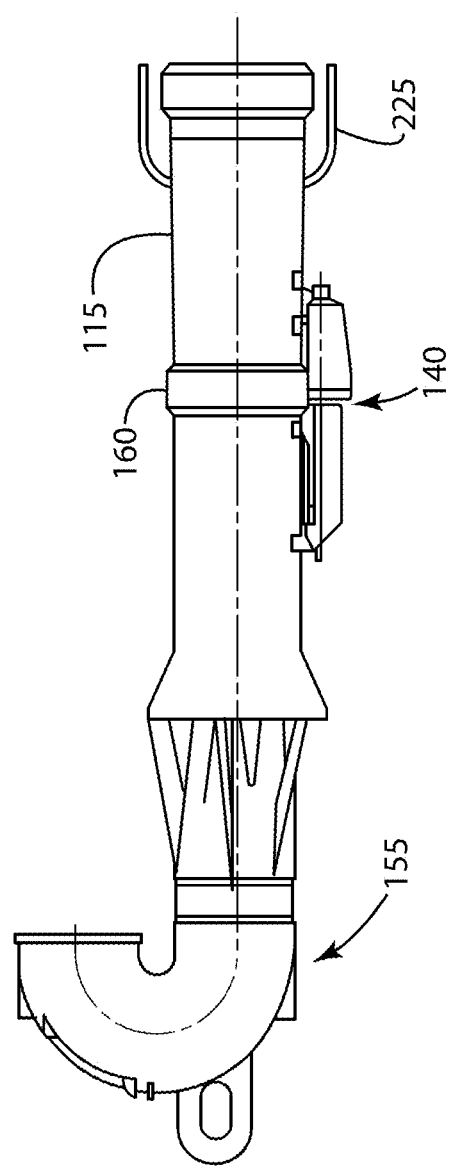

FIGS. 4A and 4B, collectively FIG. 4, are schematics of an inlet mixer 95 integrated with an embodiment of a diffuser collar 225, in accordance with an embodiment of the present invention. Changing the leakage flow characteristics from unsteady flow to steady axial flow through the slip joint 160 may prevent oscillatory slip joint 160 motions and may mitigate the FIV. Adding a flow-limiting component on the outlet side of the slip joint 160, indicated by direction arrow 200 (FIG. 3), may change the leakage flow characteristics.

The goal of an embodiment of the present invention is to provide a simple yet effective component for mitigating FIV. An embodiment of the present invention provides a flow-limiting component to the outlet side of the slip joint 160. This may serve to increase the pressure-drop across the slip joint 160. This component may take the form a diffuser collar 225. The diffuser collar 225 may also be considered a channel that is connected to a portion of the diffuser 115.

An embodiment of the diffuser collar 225 may reduce the leakage associated with the slip joint 160. As discussed, reducing this leakage may mitigate the FIVs experienced by the inlet mixer 95. An embodiment of the diffuser collar 225 may accomplish this by limiting the fluid flow exiting the slip joint 160.

An embodiment of the diffuser collar 225 may be located adjacent the slip joint 160. For example, but not limiting of, the diffuser collar 225 may be located downstream of the slip joint 160. Here, the diffuser collar 225 may partially extend over an outer surface of the diffuser 115.

An embodiment of the diffuser collar 225 may have a U-shape or a parabolic shape. However, other embodiments of the present invention may have diffuser collar's 225 that have other shapes.

An embodiment of the diffuser collar 225 may be attached to the diffuser 115. Attachments methods such as, but not limiting of, welding forms, or the like, may be used to affix the diffuser collar 225 to the diffuser 115. Other embodiments of the present invention may attach the diffuser collar 225 to other components of the inlet mixer 95 or the jet pump assembly 85.

An embodiment of the diffuser collar 225 may comprise at least one slot 230. The slot 230 may serve to allow a guide bar (not illustrated) of the diffuser 115 to partially extend through the diffuser collar 225. An embodiment of the diffuser collar 225 may comprise a plurality of slots 230, as illustrated in FIG. 4B.

The components of an embodiment present invention may be formed of any material capable of withstanding the operating environment to which the diffuser collar 225 may be exposed.

In use, the diffuser collar 225 may be affixed in a manner that partially or nearly completely surrounds a downstream portion of the diffuser 115. As the RPV 10 operates, the diffuser collar 225 may restrict the downstream flow of the fluid exiting the slip joint 160. This may increase the pressure drop across the slip joint 160, which may also reduce the FIVs experience by the inlet mixer 95. For example, but not limiting of, an embodiment of the present invention may increase the pressure in a range of from about 2 to about 4 times a previous pressure drop.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. For example, but not limiting of, an embodiment of the present invention may be used to: a) introduce a different vibration mode; b) to secure a pipe, cable, wire, or other similar object, at a fixed distance away from a separate structure or other object; or c) to apply a compressive load to at least one of the aforementioned objects.

What is claimed is:

1. A system for mitigating flow-induced vibrations, the system comprising:
   a slip joint formed by a mating of two conduits, wherein the slip joint is immersed in an external fluid flow about the two conduits in a longitudinal direction; and
   a collar directly contacting one of the two conduits at a position downstream in the longitudinal direction from the slip joint, wherein the collar extends in a radial direction perpendicular to the longitudinal direction and in the longitudinal direction away from the slip joint to form a channel between the collar extending in the longitudinal direction and the one conduit, and wherein the collar extends around a substantially entire perimeter of the one conduit so as to impede the external fluid flow about the one conduit.

2. The system of claim 1, wherein the collar directly contacts only the one conduit, and wherein the position is on a half of the one conduit most downstream in the longitudinal direction.

3. The system of claim 1, wherein the collar extends in the longitudinal direction to an end of the one conduit and farther in the longitudinal direction than in the radial direction such that the channel extends to the end of the one conduit and opens only at the end of the one conduit.

4. The system of claim 1, wherein the collar has a curved shape that smoothly transitions between the radial and the longitudinal direction.

5. The system of claim 1, wherein the collar includes a slot.

6. The system of claim 1, wherein the collar is directly welded to an exterior perimeter of the one conduit.

7. The system of claim 1, wherein the collar is configured to reduce leakage through the slip joint and flow-induced vibration in the slip joint by affecting the external fluid flow about the two conduits.

8. A jet pump system for dampening vibration; the system comprising:
   a pressure vessel;
   an inlet mixer inside the pressure vessel;
   a diffuser integrated with the inlet mixer via a slip joint inside the pressure vessel, wherein the diffuser is below the inlet mixer in a longitudinal direction; and
   a collar directly contacting the diffuser at a position entirely separate from the slip joint in the longitudinal direction, wherein the collar extends in a radial direction perpendicular to the longitudinal direction from the diffuser and in the longitudinal direction away from the slip joint to form a channel between the collar extending in the longitudinal direction and the diffuser, and wherein the collar extends around a substantially entire perimeter of the diffuser so as to impede the external fluid flow about the diffuser.

9. The system of claim 8, wherein the collar directly contacts only the diffuser.

10. The system of claim 8, wherein the collar includes a curve that smoothly transitions the extension of the collar from the radial direction away from the diffuser to the longitudinal direction away from the slip joint to form a U-shape with the diffuser.

11. The system of claim 10, wherein the collar extends farther in the longitudinal direction than in the radial direction.

12. The system of claim 11, wherein the collar is configured to reduce leakage through the slip joint and flow-induced vibration in the slip joint by affecting external fluid flow about the inlet mixer and diffuser.

13. The system of claim 8, wherein the pressure vessel is a Boiling Water Reactor, the system further comprising:
   a fluid coolant flowing downward in the longitudinal direction over the inlet mixer and the diffuser.

14. The system of claim 1, wherein the two conduits are an inlet mixer and a diffuser for a nuclear reactor, and wherein the inlet mixer is upstream from the diffuser in the longitudinal direction in the external fluid flow.

15. The system of claim 14, wherein the collar,
   includes a curve, extends farther in the longitudinal direction than in the radial direction, is welded to only the diffuser, and extends around a perimeter of the diffuser so as to form a channel about the diffuser.

16. A system for mitigating flow-induced vibrations in a fluid flow, system consisting essentially of:

a slip joint where two conduits overlap in a radial direction; and a collar extending radially from and angularly nearly completely around one of the conduits, wherein the collar further extends longitudinally to an end of the one conduit while still radially separated from and angularly nearly completely around the one conduit, wherein the collar does not overlap the other of the conduits in the radial direction collar.

* * * * *